(12) United States Patent
Norden (10) Patent No.: US 10,859,830 B2
(45) Date of Patent: Dec. 8, 2020

(54) IMAGE ADJUSTMENT FOR AN EYE TRACKING SYSTEM

(71) Applicant: Sony Interactive Entertainment Inc., Tokyo (JP)

(72) Inventor: Chris Norden, San Mateo, CA (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 73 days.

(21) Appl. No.: 15/885,176

(22) Filed: Jan. 31, 2018

(65) Prior Publication Data
US 2019/0235247 A1    Aug. 1, 2019

(51) Int. Cl.
| | | |
|---|---|---|
| G02B 27/01 | (2006.01) | |
| G01V 8/22 | (2006.01) | |
| G06F 3/01 | (2006.01) | |
| G02B 27/00 | (2006.01) | |

(52) U.S. Cl.
CPC ......... G02B 27/0172 (2013.01); G01V 8/22 (2013.01); G06F 3/013 (2013.01); G02B 27/0093 (2013.01); G09G 2320/0626 (2013.01)

(58) Field of Classification Search
CPC ...... G02B 27/0172; G01V 8/22; G06F 3/013; G09G 2320/0626
USPC ......................................................... 345/77
See application file for complete search history.

(56) References Cited

U.S. PATENT DOCUMENTS

| | | | | |
|---|---|---|---|---|
| 5,781,275 A | * | 7/1998 | Kohayakawa | ........... A61B 3/15 351/205 |
| 2013/0242262 A1 | * | 9/2013 | Lewis | ............... G02B 27/0093 351/209 |
| 2015/0168716 A1 | * | 6/2015 | Gotoda | .................. G02B 27/01 345/156 |
| 2015/0169053 A1 | * | 6/2015 | Bozarth | ............ G06K 9/00604 345/156 |
| 2016/0080720 A1 | * | 3/2016 | Fullam | ................. H04N 13/398 345/156 |
| 2016/0328015 A1 | * | 11/2016 | Ha | ......................... G06F 1/163 |
| 2017/0287446 A1 | | 10/2017 | Young et al. | |
| 2017/0358141 A1 | | 12/2017 | Stafford et al. | |
| 2017/0363872 A1 | | 12/2017 | Border et al. | |
| 2017/0365101 A1 | | 12/2017 | Samec et al. | |
| 2019/0156100 A1 | * | 5/2019 | Rougeaux | .............. G06F 3/013 |

* cited by examiner

Primary Examiner — Amare Mengistu
Assistant Examiner — Gloryvid Figueroa-Gibson
(74) Attorney, Agent, or Firm — Trellis IP Law Group, PC (57) ABSTRACT

Embodiments generally relate to adjusting images for an eye tracking system. In some embodiments, a method includes presenting one or more images to a user. The method further includes obtaining gaze tracking data relating to a gaze of the user with respect to the one or more images presented to the user. The method further includes detecting one or more first gaze characteristics from the gaze tracking data, wherein the one or more first gaze characteristics indicate a first state of the gaze of the user. The method further includes reducing a brightness of at least a portion of the one or more images presented to the user based on the one or more first gaze characteristics.

18 Claims, 6 Drawing Sheets

IMAGE ADJUSTMENT FOR AN EYE TRACKING SYSTEM

BACKGROUND

A head-mounted display (HMD) device is a graphical display device that is worn on a user's head. An HMD typically provides a wide field of view to a user by using a display optic in front of one eye or each eye. With some eye tracking systems, squinting can cause the eye tracking to be less accurate or to fail altogether. This can occur where the eye tracking system relies upon "glints" or particular light reflections from a light source reflected from an area of the eye (i.e., the eyeball). The glints are detected and can be used to interpret the position of the eye. When a user squints, the eye is more covered by the surrounding skin such as the eyelids, bottom of the eye socket, etc. and one or more of the glints can be occluded or otherwise prevented from reflecting back to a detector or sensor.

SUMMARY

Embodiments generally relate to adjusting images in an eye tracking system. In environments such as a head-mounted display (HMD) device, a system dynamically reduces the brightness of least a portion of one or more images presented to a user if the system detects the user squinting. The reduced brightness encourages the user's eyes to stop squinting after which the system restores the brightness.

In some embodiments, a method includes presenting one or more images to a user. The method further includes obtaining gaze tracking data relating to a gaze of the user with respect to the one or more images presented to the user. The method further includes detecting one or more first gaze characteristics from the gaze tracking data, wherein the one or more first gaze characteristics indicate a first state of the gaze of the user. The method further includes reducing a brightness of at least a portion of the one or more images presented to the user based on the one or more first gaze characteristics.

With further regard to the method, in some embodiments, the one or more images are presented to the user by a display device of a head-mounted display. In some embodiments, the obtaining of the gaze tracking data is performed in a head-mounted display. In some embodiments, the obtaining of the gaze tracking data is performed by an eye tracking device of a head-mounted display. In some embodiments, the obtaining of the gaze tracking data is performed using an integrated camera of a head-mounted display. In some embodiments, the gaze tracking data comprise an amount of reflections of light off of a cornea of at least one eye of the user. In some embodiments, the first state of the gaze of the user is a squinting state. In some embodiments, the one or more first gaze characteristics indicate an amount of squinting. In some embodiments, the detecting of the one or more first gaze characteristics comprises determining some missing glints off at least one eye of the user. In some embodiments, the method further includes generating a squint value, wherein the squint value represents an amount of squinting. In some embodiments, the method further includes generating a squint value, wherein the squint value is based on a reduction of a corneal reflection value associated with at least one eye of the user. In some embodiments, the one or more first gaze characteristics comprise a change in a corneal reflection value associated with at least one eye of the user. In some embodiments, the one or more first gaze characteristics comprise a reduction in a corneal reflection value associated with at least one eye of the user. In some embodiments, the method further includes reducing the brightness of the one or more images for a predetermined duration of time. In some embodiments, the method further includes reducing the brightness of the one or more images based on the first gaze characteristics. In some embodiments, the method further includes restoring the brightness of the one or more images based on one or more second gaze characteristics. In some embodiments, the method further includes restoring the brightness of the one or more images based on a change of the first state. In some embodiments, the method further includes restoring the brightness of the one or more images when the user's gaze changes from the first state to a second state, wherein the second state is a non-squinting state.

In some embodiments, a non-transitory computer-readable storage medium with program instructions thereon is provided. When executed by one or more processors, the instructions are operable to perform operations including presenting one or more images to a user; obtaining gaze tracking data relating to a gaze of the user with respect to the one or more images presented to the user; detecting one or more first gaze characteristics from the gaze tracking data, wherein the one or more first gaze characteristics indicate a first state of the gaze of the user; and reducing a brightness of at least a portion of the one or more images presented to the user based on the one or more first gaze characteristics.

In some embodiments, a system includes one or more processors, and includes logic encoded in one or more non-transitory computer-readable storage media for execution by the one or more processors. When executed, the logic is operable to perform operations including presenting one or more images to a user; obtaining gaze tracking data relating to a gaze of the user with respect to the one or more images presented to the user; detecting one or more first gaze characteristics from the gaze tracking data, wherein the one or more first gaze characteristics indicate a first state of the gaze of the user; and reducing a brightness of at least a portion of the one or more images presented to the user based on the one or more first gaze characteristics.

A further understanding of the nature and the advantages of particular embodiments disclosed herein may be realized by reference of the remaining portions of the specification and the attached drawings.

DETAILED DESCRIPTION

Embodiments described herein generally relate to adjusting images in an eye tracking system. In environments such as a head-mounted display (HMD) device, a system dynamically reduces the brightness of least a portion of one or more images presented to a user if the system detects the user squinting. The reduced brightness encourages the user's eyes to stop squinting after which the system restores the brightness.

When using eye tracking in applications such as virtual reality (VR), some user behavior such as blinking or squinting may cause errors in the rendering. This is due to the eye tracking hardware not being able to reliably see eye glints. As described in more detail herein, when the system detects a squint, the system dynamically lowers the screen brightness. This should cause the user to re-open the eyes because of the decreased light output. This enables the eye tracking to resume properly. As such, the screen brightness modulation in response to detected squinting may eliminate some of these errors.

In some embodiments, the system presents one or more images to a user. The system further obtains gaze tracking data relating to a gaze of the user with respect to the one or more images presented to the user. The system further detects one or more first gaze characteristics from the gaze tracking data, where the one or more first gaze characteristics indicate a first state of the gaze of the user (e.g., a squinting state). The system then reduces the brightness of at least a portion of the one or more images presented to the user based on the one or more first gaze characteristics. The system then restores the brightness of the one or more images based on one or more second gaze characteristics, where the one or more second gaze characteristics indicate a second state of the gaze of the user (e.g., a non-squinting state).

Although embodiments disclosed herein are described in the context of head-mounted devices, the embodiments may also apply to other graphical display technologies that provide a user with a wide field of view. For example, embodiments may apply to glasses. Embodiments may apply to technologies that may or may not be physically mounted on the user's head such as external projection devices or systems, etc.

Although particular embodiments may be related to image rendering applications such as foveated rendering, features described herein can be applied to any system or circumstance where eye tracking is useful or desired.

The following describes gaze tracking within the context of embodiments described herein. Eye gaze tracking has use in a wide range of applications, including medical research, automobile technology, computer entertainment and video game programs, VR applications, control input devices, augmented reality glasses, and more. There are a number of techniques for eye tracking, also known as gaze tracking. Some of these techniques determine a user's gaze direction from the orientation of the pupils of the user's eyes. Some known eye gaze tracking techniques involve illuminating the eyes by emitting light from one or more light sources and detecting reflections of the emitted light off of the corneas with a sensor. Typically, this is accomplished using invisible light sources in the infrared range and capturing image data (e.g., images or video) of the illuminated eyes with an infrared sensitive camera. Image processing algorithms are then used to analyze the image data to determine eye gaze direction. While some embodiments are described as using infrared light, these embodiments and others may use any visible or invisible light to generate reflections.

Generally, eye tracking image analysis takes advantage of characteristics distinctive to how light is reflected off of the eyes to determine eye gaze direction from the image. For example, the image may be analyzed to identify eye location based on corneal reflections in the image data, and the image may be further analyzed to determine gaze direction based on the relative locations of the pupils in the image.

Two common gaze tracking techniques for determining eye gaze direction based on pupil location are known as bright pupil tracking and dark pupil tracking. Bright pupil tracking involves illumination of the eyes with a light source that is substantially in line with the optical axis of the camera, causing the emitted light to be reflected off of the retina and back to the camera through the pupil. The pupil presents in the image as an identifiable bright spot at the location of the pupil, similar to the red eye effect, which occurs in images during conventional flash photography. In this method of gaze tracking, the bright reflection from the pupil itself helps the system locate the pupil if contrast between the pupil and the iris is not enough.

Dark pupil tracking involves illumination with a light source that is substantially off line from the optical axis of the camera, causing light directed through the pupil to be reflected away from the optical axis of the camera, resulting in an identifiable dark spot in the image at the location of the pupil. In alternative dark pupil tracking systems, an infrared light source and cameras directed at eyes can look at corneal reflections. Such camera-based systems track the location of the pupil and corneal reflections, which provide parallax due to different depths of reflections and give additional accuracy.

Figure 1:
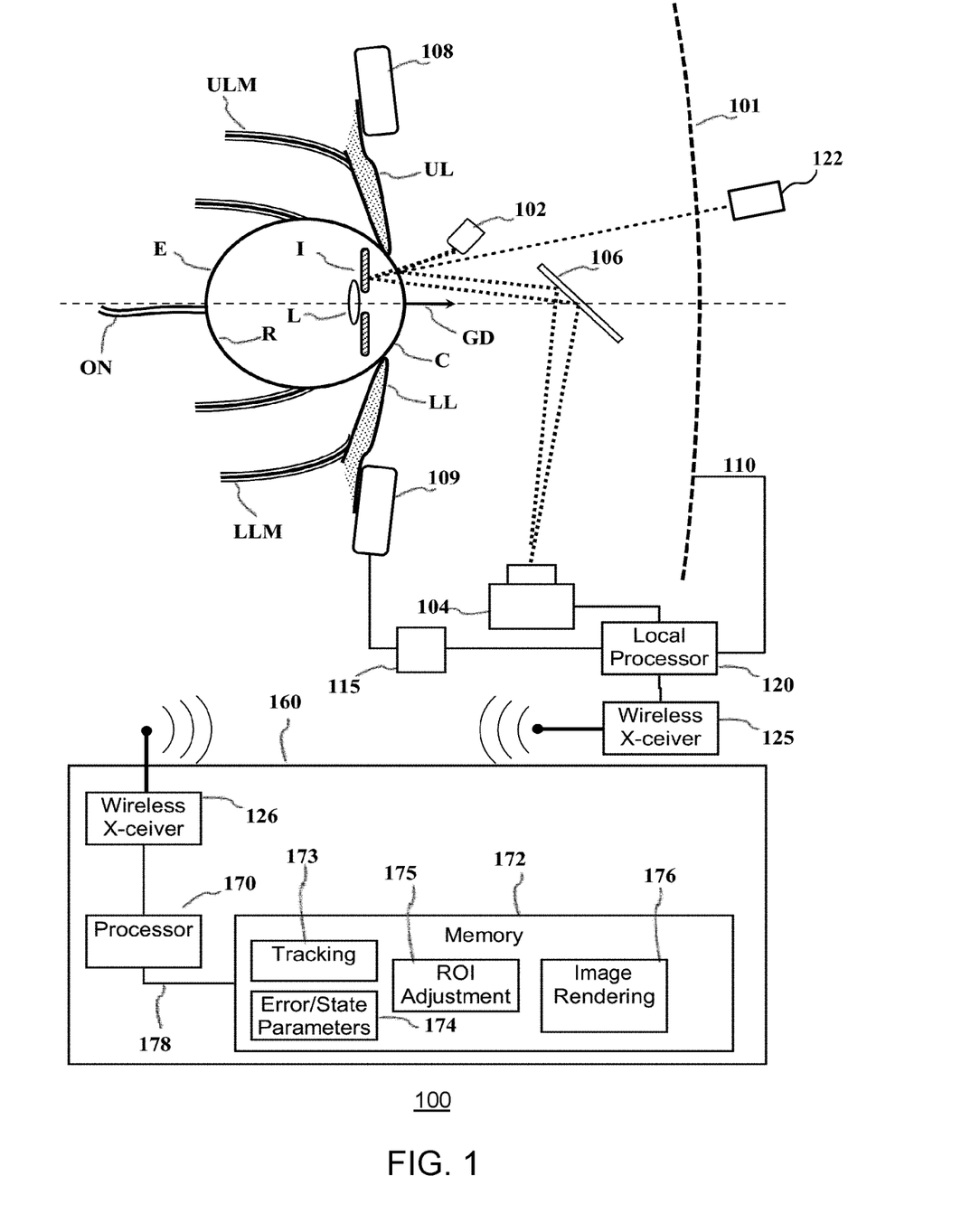
FIG. 1 is a diagram illustrating a gaze tracking system, which may be used for embodiments described herein.

FIG. 1 is a diagram illustrating a gaze tracking system 100, which may be used for embodiments described herein. In various embodiments, the gaze tracking system 100 may be a dark pupil gaze tracking system. The gaze tracking system tracks the orientation of a user's eye E relative to a display screen 101 on which visible images are presented.

While a display screen is utilized in the example system 100, certain alternative embodiments may utilize an image projection system capable of projecting images directly into the eyes of a user. In these embodiments, the user's eye E would be tracked relative to the images projected into the user's eyes. In this example, the eye E gathers light from the screen 101 through a variable iris I; and a lens L projects an image on the retina R. The opening in the iris is known as the pupil. Muscles control rotation of the eye E in response to nerve impulses from the brain. Upper and lower eyelid muscles ULM, LLM respectively control upper and lower eyelids UL, LL in response to other nerve impulses.

Light sensitive cells on the retina R generate electrical impulses that are sent to the user's brain (not shown) via the optic nerve ON. The visual cortex of the brain interprets the impulses. Not all portions of the retina R are equally sensitive to light. Specifically, light-sensitive cells are concentrated in an area known as the fovea.

The illustrated image tracking system includes one or more infrared light sources 102, e.g., light emitting diodes (LEDs) that direct non-visible light (e.g., infrared light) toward the eye E. Part of the non-visible light reflects from the cornea C of the eye, and part reflects from the iris. The reflected non-visible light is directed toward a suitable sensor 104 such as an image sensor (e.g., an infrared camera) by a wavelength-selective mirror 106. The mirror transmits visible light from the screen 101 but reflects the non-visible light reflected from the eye.

The sensor 104 is preferably an image sensor, e.g., a digital camera that can produce an image of the eye E, which may be analyzed to determine a gaze direction GD from the relative position of the pupil. This image may be produced with a local processor 120 or via the transmission of the obtained gaze tracking data to a remote computing device 160. The local processor 120 may be configured according to well-known architectures, such as, for example, single-core, dual-core, quad-core, multi-core, processor-coprocessor, cell processor, and the like. The image tracking data may be transmitted between the sensor 104 and the remote computing device 160 via a wired connection (not shown), or wirelessly between a wireless transceiver 125 included in the eye tracking device and a second wireless transceiver 126 included in the remote computing device 160. The wireless transceivers may be configured to implement a local area network (LAN) or personal area network (PAN), via a suitable network protocol, e.g., Bluetooth, for a PAN.

The gaze tracking system 100 may also include an upper sensor 108 and lower sensor 109 that are configured to be placed, for example, respectively above and below the eye E. Sensors 108 and 109 may be independent components, or may alternatively be part of a component 110 worn on the user's head that may include, but is not limited to, any combination of the sensor 104, local processor 120, or inertial sensor 115 described below. In the example system 100, sensors 108 and 109 are capable of collecting data regarding the electrical impulses of the nervous system and/or the movement and/or vibration of the muscular system from those areas surrounding the eye E. This data may include for example, electrophysiological and/or vibrational information of the muscles and/or nerves surrounding the eye E as monitored by the upper sensor 108 and lower sensor 109. The electrophysiological information collected by sensors 108 and 109 may include, for example, electroencephalography (EEG), electromyography (EMG), or evoked potential information collected as a result of nerve function in the area(s) surrounding the eye E. Sensors 108 and 109 may also be capable of collecting, for example, mechanomyogram or surface electromyogram information as a result of detecting the muscular vibrations or twitches of the muscles surrounding the eye E. The data collected by sensors 108 and 109 may be delivered with the image tracking data to the local processor 120 and/or the remote computing device 160 as described above.

The gaze tracking system 100 may also be capable of tracking a user's head. Head tracking may be performed by an inertial sensor 115 capable of producing signals in response to the position, motion, orientation or change in orientation of the user's head. This data may be sent to the local processor 120 and/or transmitted to the remote computing device 160. The inertial sensor 115 may be an independent component, or may alternatively be part of a component 110 worn on the user's head that may include, but is not limited to, any combination of the sensor 104, local processor 120, or sensors 108 and 109 described above. In alternative embodiments, head tracking may be performed via the tracking of light sources, or tracking by other mechanisms attached to component 110.

The remote computing device 160 may be configured to operate in coordination with the eye tracking device and the display screen 101, in order to perform eye gaze tracking and determine lighting conditions in accordance with aspects of the present disclosure. The computing device 160 may include one or more processor units 170, which may be configured according to well-known architectures, such as, for example, single-core, dual-core, quad-core, multi-core, processor-coprocessor, cell processor, and the like. The computing device 160 may also include one or more memory units 172 (e.g., random access memory (RAM), dynamic random access memory (DRAM), read-only memory (ROM), and the like).

The processor unit 170 may execute one or more programs, portions of which may be stored in the memory 172, and the processor 170 may be operatively coupled to the memory 172, e.g., by accessing the memory via a data bus 178. The programs may be configured to perform eye gaze tracking and determine lighting conditions for the system 100. By way of example, and not by way of limitation, the programs may include gaze tracking programs 173, the execution of which may cause the system 100 to track a user's gaze. For example, as discussed above, the user's gaze may be tracked by error and state parameter determination programs 174, image adjustment programs 175 (labeled ROI Adjustment), and image rendering programs 176, the execution of which render images to be presented on the display. In some embodiments, the image adjustments programs 175 may use error and/or state parameters to determine potential adjustments that can be made to images presented, and to adjust the images to be presented on the display, respectively.

By way of example, and not by way of limitation, the gaze tracking programs 173 may include processor executable instructions which cause the system 100 to determine one or more gaze tracking parameters of the system 100 from eye tracking data gathered with the sensor 104 and eye movement data gathered from the upper and lower sensors 108 and 109, respectively, while light is emitted from the lighting source 102. In some embodiments, the gaze tracking programs 173 may also include instructions, which analyze images gathered with the sensor 104 in order to detect the presence of a change in lighting conditions.

Figure 2:
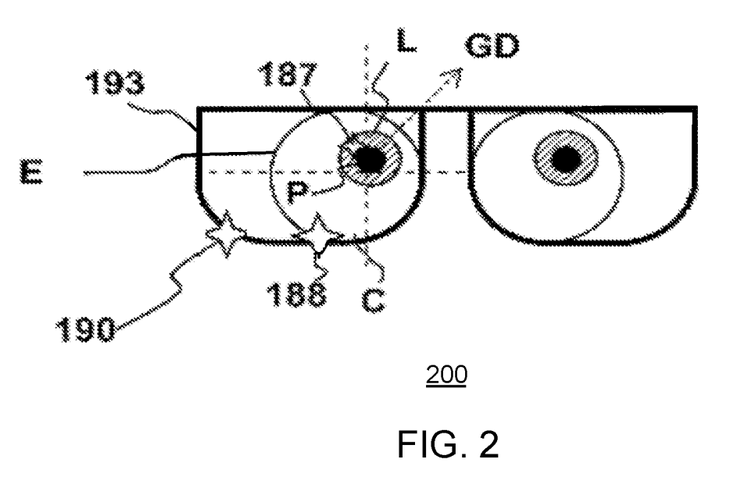
FIG. 2 is a diagram illustrating a user's eyes and display device, which may be used for embodiments described herein.

FIG. 2 is a diagram illustrating a user's eyes and display device, which may be used for embodiments described herein. Referring to both FIGS. 1 and 2, the image 180 showing a user's eyes E may be analyzed to determine a gaze direction GD from the relative position of the pupil. For example, image analysis may determine a 2-dimensional offset of the pupil P from a center of the eye E in the image. The location of the pupil relative to the center may be converted to a gaze direction relative to the screen 101, by a straightforward geometric computation of a three-dimensional vector based on the known size and shape of the eyeball. The determined gaze direction GD is capable of showing the rotation and acceleration of the eye E as it moves relative to the screen 101.

The image may also include reflections 187 and 188 of the non-visible light from the cornea C and the lens L, respectively. Because the cornea and lens are at different depths, the parallax and refractive index between the reflections may be used to provide additional accuracy in determining the gaze direction GD. An example of this type of eye tracking system is a dual Purkinje tracker, wherein the corneal reflection is the first Purkinje image and the lens reflection is the fourth Purkinje image. In some scenarios, there may also be reflections 190 from a user's eyeglasses 193, if these are worn by the user.

In some embodiments, camera-based eye tracking can be augmented with other methods to update eye tracking during a blink phase. Examples of augmentation include providing EEG information in addition to the image information in order to detect nerve impulses that trigger eye muscle activity. This information can also be used help detect the start and end of blinks and saccades. Eye tracking systems can determine whether the vision system is in a saccade or not by high-pass filtering based on rate of eye movement.

Performance of eye tracking systems depends on a multitude of factors, including the placement of light sources (infrared [IR], visible, etc.) and cameras, whether user is wearing glasses or contacts, HMD optics, frame rate, exposure time, camera optics, tracking system latency, rate of eye movement, shape of eye (which changes during the course of the day or can change as a result of movement), eye conditions, e.g., lazy eye, gaze stability, fixation on moving objects, scene being presented to user, and user head motion.

Figure 3:
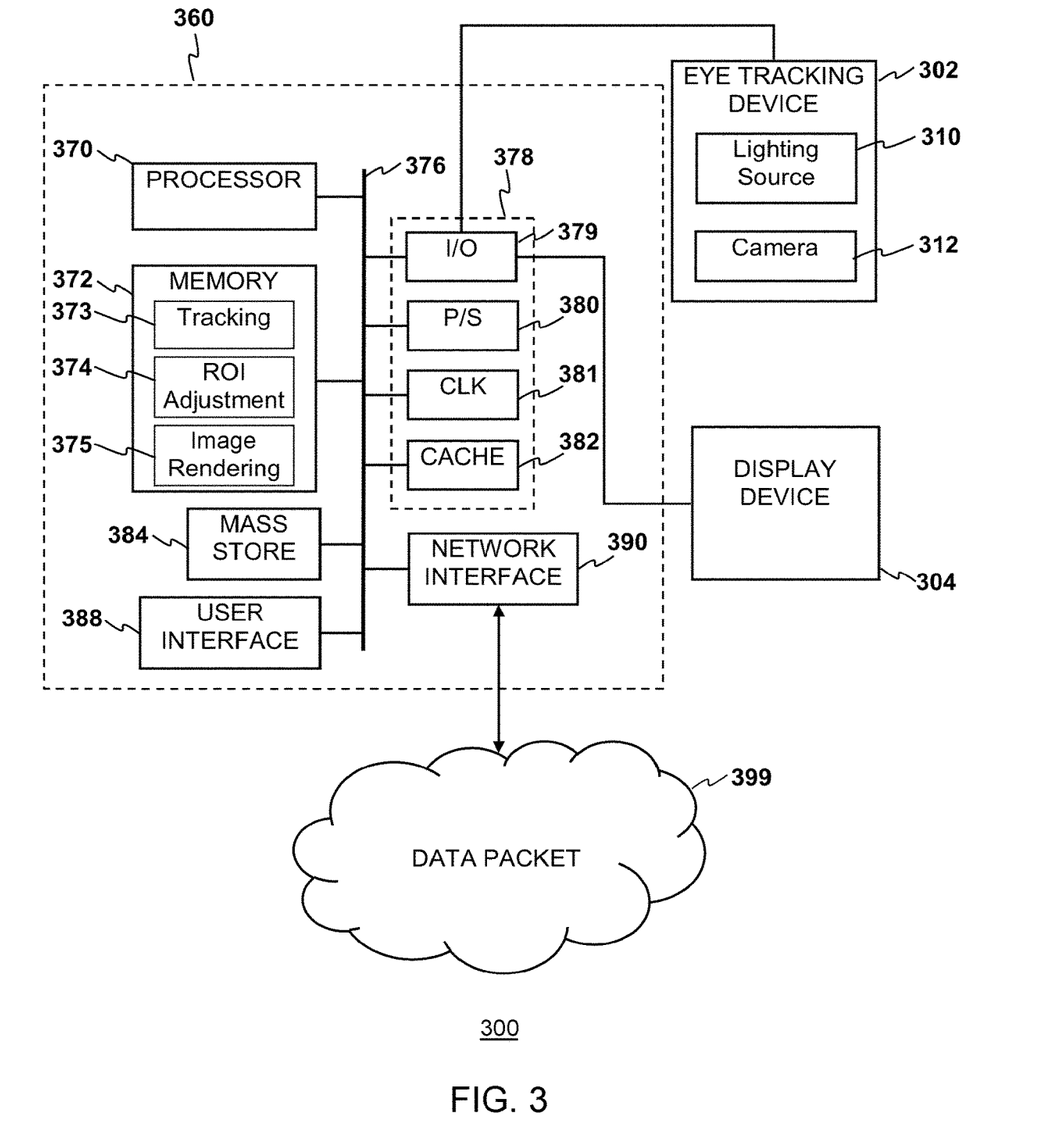
FIG. 3 is a block diagram depicting an eye tracking system, which may be used for embodiments described herein.

FIG. 3 is a block diagram depicting an eye tracking system 300, which may be used for embodiments described herein. The example system 300 may include a computing device 360, which is coupled to an eye tracking device 302 and a display device 304 in order to perform eye gaze tracking and/or calibration for eye tracking in accordance with aspects of the present disclosure. The display device 304 may be in the form of a cathode ray tube (CRT), flat panel screen, touch screen, projector, retinal imager, or other device that displays text, numerals, graphical symbols, or other visual objects. According to aspects of the present disclosure, the computing device 360 may be an embedded system, mobile phone, personal computer, tablet computer, portable game device, workstation, game console, and the like. Moreover, the computing device 360, the eye tracking device 302, the display device 304, or any combination thereof may form an integral unit or be implemented as separate components which may be in communication with each other.

The eye tracking device 302 may be coupled to the computing device 360, and may include a dynamic lighting source 310. By way of example, and not by way of limitation, the lighting source 310 may be an invisible lighting source in the form of one or more infrared LEDs, which may be configured to illuminate a user's eyes in order to gather eye tracking data with a sensor such as camera 312. The camera 312 of the eye tracking device may be a detector, which is sensitive to light emitted from the light source 310. For example, the camera 312 may be a camera sensitive to the light source such as an infrared camera, and the camera 312 may be positioned relative to the eye tracking device 302 and the lighting source 310 so that it may capture images of an area illuminated by the lighting source 310.

The computing device 360 may be configured to operate in coordination with the eye tracking device 302 and the display device 304, in order to perform eye gaze tracking and determine lighting conditions in accordance with aspects of the present disclosure. The computing device 360 may include one or more processor units 370, which may be configured according to well-known architectures, such as, for example, single-core, dual-core, quad-core, multi-core, processor-coprocessor, cell processor, and the like. The computing device 360 may also include one or more memory units 372 (e.g., random access memory (RAM), dynamic random access memory (DRAM), read-only memory (ROM), and the like).

The processor unit 370 may execute one or more programs, portions of which may be stored in the memory 372, and the processor 370 may be operatively coupled to the memory 372, e.g., by accessing the memory via a data bus 376. The programs may be configured to perform eye gaze tracking and to determine lighting conditions for the system 300. By way of example, and not by way of limitation, the programs may include gaze tracking programs 373, execution of which may cause the system 300 to track a user's gaze, image adjustment programs 374, execution of which adjust images to be presented on the display, and image rendering programs 375, execution of which render images to be presented on the display. By way of example, and not by way of limitation, the gaze tracking programs 373 may include processor executable instructions, which cause the system 300 to determine one or more gaze tracking parameters of the system 300 from eye tracking data gathered with the camera 312 while light is emitted from the dynamic lighting source 310. The gaze tracking programs 373 may also include instructions, which analyze images gathered with the camera 312.

The computing device 360 may also include support circuits 378, such as input/output (I/O) circuits 379, power supplies (P/S) 380, a clock (CLK) 381, and cache 382, which may communicate with other components of the system, e.g., via the data bus 376. The I/O circuits may include a wireless transceiver to facilitate communication with similarly configured transceivers on the eye tracking device 302 and display device 304. The processor unit 370 and wireless transceiver may be configured to implement a local area network (LAN) or personal area network (PAN), via a suitable network protocol, e.g., Bluetooth, for a PAN. The computing device 360 may optionally include a mass storage device 384 such as a disk drive, CD-ROM drive, tape drive, flash memory, or the like, and the mass storage device 384 may store programs and/or data. The computing device 360 may also include a user interface 388 to facilitate interaction between the system 300 and a user. The user interface 388 may include a keyboard, mouse, light pen, game control pad, touch interface, and/or other device(s).

The system 300 may also include a controller (not shown), which interfaces with the eye tracking device 302 in order to interact with programs executed by the processor unit 370. The system 300 may also execute one or more general computer applications (not shown), such as a video game, which may incorporate aspects of eye gaze tracking as sensed by the eye tracking device 302 and processed by the tracking programs 373, image adjustment programs 374, and image rendering programs 375.

The computing device 360 may include a network interface 390, configured to enable the use of Wi-Fi, an Ethernet port, or other communication methods. The network interface 390 may incorporate suitable hardware, software, firmware or some combination thereof to facilitate communication via a telecommunications network. The network interface 390 may be configured to implement wired or wireless communication over local area networks and wide area networks such as the Internet. The network interface 390 may also include the aforementioned wireless transceiver that facilitates wireless communication with the eye tracking device 302 and display device 304. The computing device 360 may send and receive data and/or requests for files via one or more data packets 399 over a network.

In various embodiments, image rendering may be implemented by adjusting certain parameters of the rendering process based on detection of squinting by the user. Such adjustment may include reducing the brightness of at least a portion of one or more images presented to the user.

As indicated herein, the system uses a camera to detect reflections in the user's eye and to determine the user's gaze. In some scenarios, the user may squint due to vision issues, trying to focus on something, eye strain, etc. Such user behavior may cause performance issues. For example, when the user squints, the user's eyelids occlude the reflections. Consequently, without full reflections, the eye tracking may degrade or fail. Also, the image rendering process may fail, as the system can no longer accurately track the eye. As a result, the image region can jump to where the system expects the user's gaze, which the user may notice.

Figure 4:
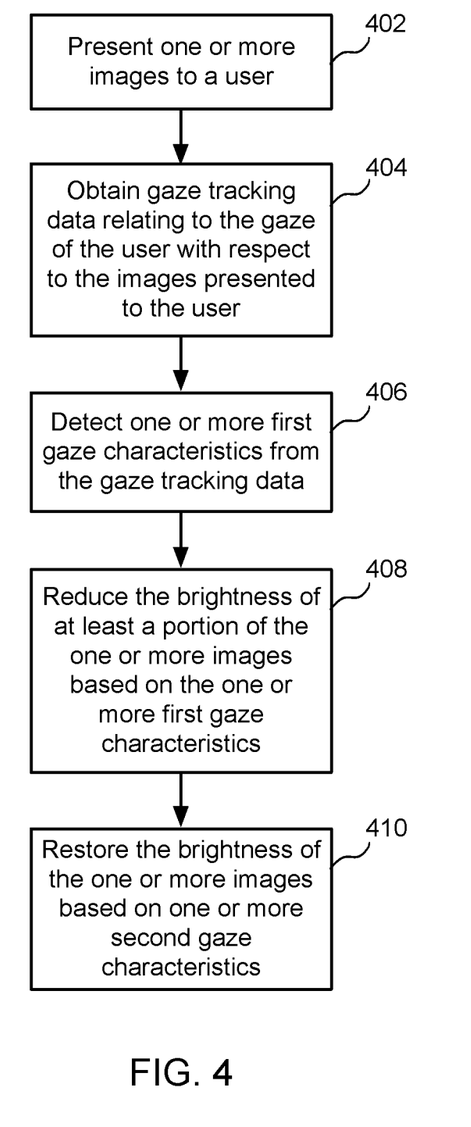
FIG. 4 illustrates an example flow diagram for adjusting images in an eye tracking system, according to some embodiments.

FIG. 4 illustrates an example flow diagram for adjusting images in an eye tracking system, according to some embodiments. Referring to both FIGS. 1, 2, and 4, a method is initiated at block 402, where the system presents one or more images to a user. In various embodiments, the one or more images is presented to the user by a display device of a head-mounted display (HMD).

At block 404, the system obtains gaze tracking data relating to the gaze of the user with respect to the one or more images presented to the user. In various embodiments, the obtaining of the gaze tracking data is performed in a head-mounted display of the HMD. In some embodiments, the obtaining of the gaze tracking data is performed by an eye tracking device of the HMD. In some embodiments, the obtaining of the gaze tracking data is performed using an integrated camera of the HMD. While some embodiments may use a camera for obtaining gaze tracking data, other technologies may also be used for obtaining gaze tracking data. For example, eye tracking systems may use micro-electro-mechanical systems (MEMS) devices or other detection methods.

In various embodiments, the gaze tracking data includes an amount of reflections of light off of a cornea of at least one eye of the user at a given time. The amount of reflections of light off of a given cornea may be referred to as the corneal reflection value. In various embodiments, the system collects gaze tracking data to determine corneal reflection values for each eye of the user at multiple times per second.

At block 406, the system detects one or more first gaze characteristics from the gaze tracking data, where the one or more first gaze characteristics indicate a particular state of the gaze of the user. For example, in some embodiments, the particular state of the gaze of the user is a squinting state. A squinting state is where the user partially closes the user's eyes. This may occur for example if the user is visually focusing on a particular image or detail of an image. For clarity, the first gaze characteristics indicate a squinting state, and second gaze characteristics (described in more detail below) indicate a non-squinting state.

In some embodiments, the one or more first gaze characteristics may indicate an amount of squinting. For example, the gaze characteristics may indicate if the eyes are closed a little or closed substantially (almost closed). As such, the detecting of the one or more first gaze characteristics includes determining some missing glints off at least one eye of the user.

As described in more detail herein, in some embodiments, to quantify the amount of squinting, the system may generate a squint value, wherein the squint value represents the amount of squinting. In some embodiments, the system may generate a squint value, where the squint value is based on a reduction of a corneal reflection value associated with at least one eye of the user. The squint value may be inversely proportional to the corneal reflection value. For example, if the user is squinting (eyes partially closed), the system would detect a reduced corneal reflection value and may subsequently generate an increased squint value based on the corneal reflection value.

In some embodiments, the one or more first gaze characteristics include a change in a corneal reflection value associated with at least one eye of the user. For example, if the corneal reflection value drops due to a squint, the system records/logs that the corneal reflection value changed.

In some embodiments, the one or more first gaze characteristics include a reduction in a corneal reflection value associated with at least one eye of the user. For example, if the corneal reflection value drops due to a squint, the system records/logs how much the corneal reflection value changed, as well as the corneal reflection values at different points in time.

At block 408, the system reduces the brightness of at least a portion of the one or more images presented to the user based on the one or more first gaze characteristics, the first gaze characteristics indicating the squinting state. The system may reduce the brightness of the screen or a particular portion of an image, a particular image, multiple portions of multiple images, or all images, depending on the particular embodiment. Dynamically lowering the screen brightness reduces the amount of light going into the eyes. This in turn may cause the pupils to involuntarily dilate to receive more light, and may then further cause the user to open the eyes (stop squinting).

In some embodiments, the system reduces the brightness of the one or more images for a predetermined duration of time. For example, the system reduces the brightness of the one or more images and sustains the reduced brightness for a set time period (e.g., 0.10 seconds, 0.20 seconds, etc.). The time duration of an involuntary squint may vary, depending on the cause (e.g., 0.5 seconds, 1.0 seconds, etc.). Reducing the brightness even momentarily may cause the use to immediately open the eyes and stop squinting.

In some embodiments, the system reduces the brightness of the one or more images based on the first gaze characteristics. The system may reduce the brightness of the one or more images based on the squint value. For example, the system may reduce the brightness of the one or more images if the squint value is larger. Conversely, the system may reduce the brightness of the one or more images relatively less if the squint value is small. As such, the amount of reduction of brightness is proportional to the amount of squinting. In other words, the larger the squint the darker the screen.

In various embodiments, the system reduces the brightness for long enough to encourage or cause the eyes of the user to stop squinting. As described in more detail below, the system restores the brightness quickly enough such that the user does not consciously aware of the change in brightness so as to compromise user experience. For example, these operation may occur at screen refresh rate of 120 Hz or eye track refresh rate of 240 Hz, etc.

At block 410, the system restores the brightness of the one or more images based on one or more second gaze characteristics, where the second gaze characteristics indicate a non-squinting state. Restoring the brightness (e.g., to full brightness) may cause the user to open the eyes (stop squinting), which will in turn enable the eye tracking to receive full reflections and operate properly. In some embodiments, the system restores the brightness of the one or more images based on a change of the state of the eyes of the user. For example, the system may restore the brightness of the one or more images when the user's gaze changes from a squinting state to a subsequent non-squinting state. In some embodiments, the system may restore the brightness by immediately stepping up the brightness. In some embodiments, the system may restore the brightness by quickly ramping up the brightness. In some embodiments, the system may enable the user adjust how the brightness is automatically restored.

In some embodiments, the system detects one or more second gaze characteristics from the gaze tracking data, where, as indicated above, such second gaze characteristics indicate a non-squinting state of the user's gaze. Upon determination that the user's gaze is in a non-squinting state, the system increases the brightness of the one or more images. In some embodiments, the system increases the brightness to the previous level during the pre-squinting state.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 5:
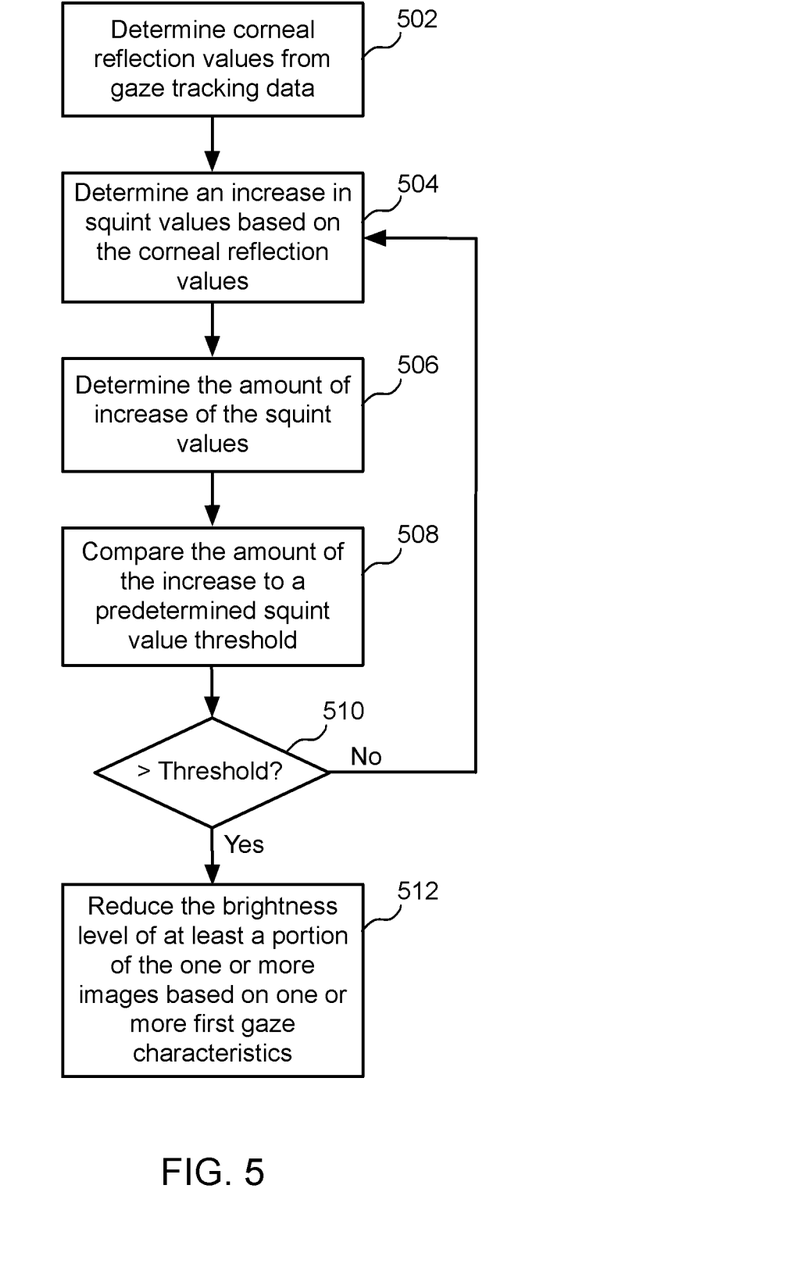
FIG. 5 illustrates an example flow diagram for reducing the brightness level of one or more images presented to a user, according to some embodiments.

FIG. 5 illustrates an example flow diagram for reducing the brightness level of one or more images presented to a user, according to some embodiments. Referring to both FIGS. 1, 2, and 5, a method is initiated at block 502, where the system determines corneal reflection values from gaze tracking data. As indicated herein, a corneal reflection value represents an amount of reflections of light off of the cornea of at least one eye of the user.

At block 504, the system determines an increase in squint values based on the corneal reflection values. As indicated herein, a squint value represents the amount of squinting. More specifically, an increase in squint values represents a reduced amount of reflections of light off of the cornea of at least one eye of the user. In other words, an increase in squint values corresponds to a decrease in corneal reflection values.

At block 506, the system determines the amount of increase of the squint values.

At block 508, the system compares the amount of the increase to a predetermined squint value threshold.

At block 510, the system determines if the amount of the increase is above the predetermined squint value threshold. If not, the system continues to determine an increase in squint values based on the corneal reflection values at block 504.

At block 512, the system reduces the brightness level of at least a portion of the one or more images based on one or more first gaze characteristics. In various embodiments, the gaze characteristics include the amount of the increase in squint values and the time duration that the squint values are above the predetermined squint value threshold. In some embodiments, the system determines a brightness reduction value based on the amount of the increase to a predetermined squint value threshold. As such, the system reduces the brightness level of at least a portion of the one or more images based on the brightness reduction value.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

In some embodiments, images (e.g., video game images) being displayed in the virtual reality (VR) headset to create eye glints may be detected by a camera. In some embodiments, dedicated patterns ("glint images") and/or actual game images ("presentation images") may be used to read the positions of the eyes by correlating the reflections at the sensors to the known images being presented by the screens. In a system where the rendering of the display and the glint detection is under the control of a coordinated system, (e.g., same set of processors and/or software, or two or more systems in communication or synchronization) the display screen itself can be used to generate the glint images or patterns on the user's eye as opposed to having a separate component and system to generate the glint images. In some embodiments, the presentation images need not be altered in order to provide glint detection but can be the regular course of rendered frames as in, for example, a computer game. Data on all or a portion of the pixel values being rendered can be used to correlate to the sensed reflection of a presentation image on the eye and can be used to determine the eye position and/or tracking.

This differs from some embodiments described herein in that it determines eye position rather than using separate LED emitters to create a pattern on the eye. In some embodiments, there is complete knowledge and control over the image being presented and the reception of the reflection on the eye.

Such a technique can be alternative or supplemental (e.g., used with LEDs). The supplemental mode may be turned on or off triggered by specific tracking situations. For example, an extreme perimeter position of eye may be helpful to add more light via graphically created glints.

In some embodiments, the system may include an internal micro camera or other sensor within the field of view of the screen. One or more sensors can be in front of, behind, within, overlapping, integrated with or otherwise occupying the same viewing cone as a screen used in the display system, as opposed to systems that have the sensor mounted outside of the viewing cone, also referred to as a viewing field, angle, frustrum, etc. An example of a sensor occupying the same viewing field as the screen is shown in FIG. 1 where micro camera 122 is shown behind screen 101. The system may communicate with an LCD or similar device that is embedded with multiple (e.g., several, many, tens, thousands, etc.) small image sensors that would allow users to view the display while looking straight into the "camera." The system may stitch the data accumulated by the individual sensors into larger images and use the images for eye tracking as well as for displaying images.

In some embodiments, the system may perform time division multiplex operations to separate the presentation images from glint images. For example, a liquid crystal display ("LCD") or other shutter system can be used between the image data and sensors to mask the presentation images from the sensors while permitting the computer generated-glint tracking image data. Using this approach there may be an advantage that one or more of the glint sensors can be directly in-line with the user's viewing direction which can improve performance.

Figure 6:
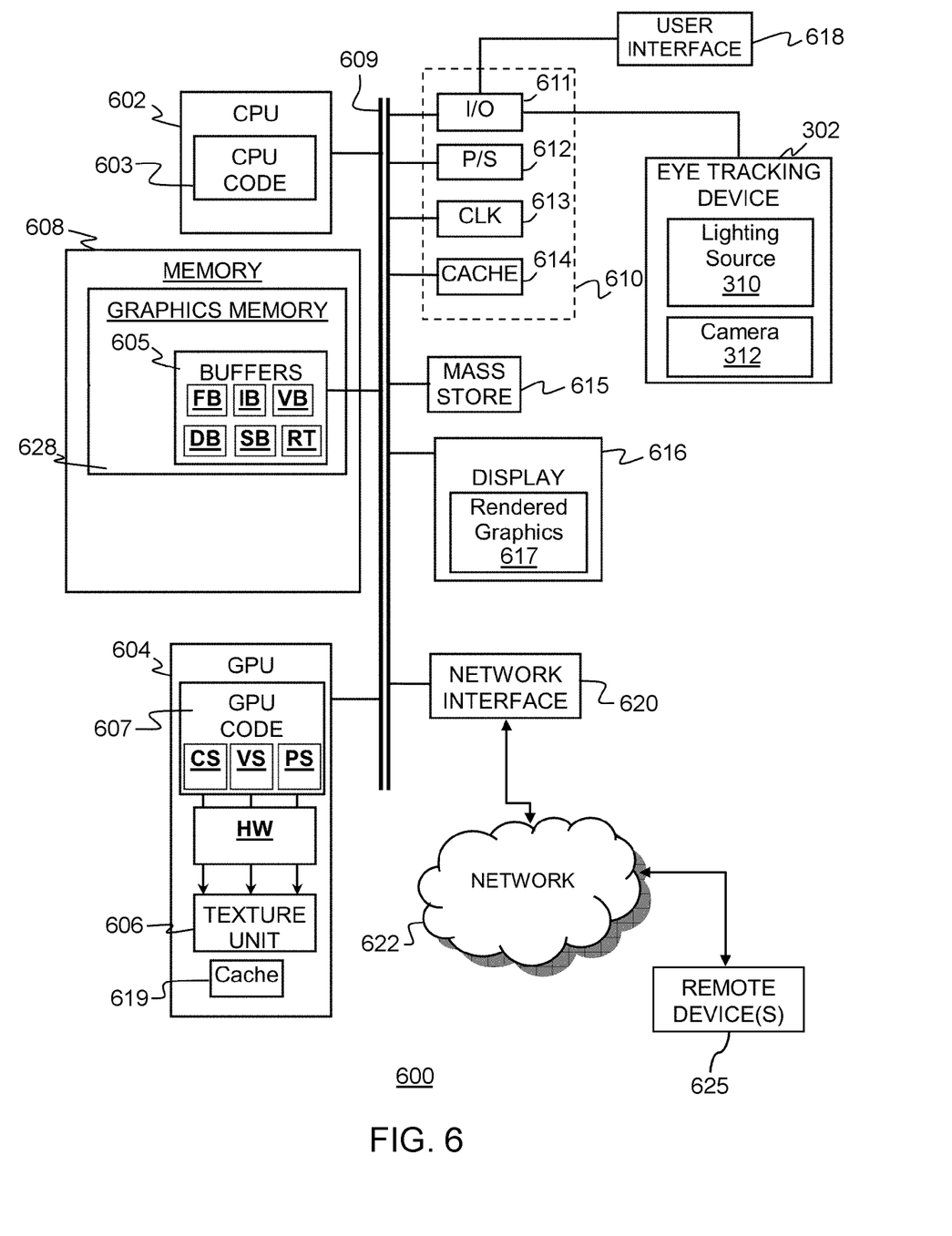
FIG. 6 is a block diagram of a graphics processing system, which may be used for embodiments described herein.

FIG. 6 is a block diagram of a graphics processing system 600, which may be used for embodiments described herein. Embodiments may include graphics processing systems that are configured to implement graphics processing in which effective resolution varies by screen location by adjusting a density of vertices for selected portions of the screen-space with respect to portions of the screen space determined to be portions of interest. By way of example, and not by way of limitation, as shown, a computer system 600 may be used to implement graphics processing according to aspects of the present disclosure. According to aspects of the present disclosure, the system 600 may be an embedded system, mobile phone, personal computer, tablet computer, portable game device, workstation, game console, and the like.

The system 600 generally includes a central processor unit (CPU) 602, a graphics processor unit (GPU) 604, and a memory 608 that is accessible to both the CPU and GPU. The system 600 may also include well-known support functions 610, which may communicate with other components of the system, e.g., via a data bus 609. Such support functions may include, but are not limited to, input/output (I/O) elements 611, power supplies (P/S) 612, a clock (CLK)

613, and cache 614. In addition to the cache 614, the GPU 604 may include its own GPU cache 619, and the GPU may be configured so that programs running on the GPU 604 can read-through or write-though the GPU cache 619.

The system 600 may be configured to obtain and analyze gaze tracking information for optimization of image rendering as discussed above. In some embodiments, the system 600 may include the eye tracking device 302 with lighting source 312 and camera 312, as discussed above with respect to FIG. 3. Alternatively, the system may be configured to interoperate with these components, e.g., via the I/O elements 611.

The system 600 may include the display device 616 to present rendered graphics 617 to a user. In alternative embodiments, the display device 616 is a separate component that works in conjunction with the system, 600. The display device 616 may be in the form of a flat panel display, head mounted display (HMD), cathode ray tube (CRT) screen, projector, or other device that can display visible text, numerals, graphical symbols or images. In particularly useful embodiments, the display 616 is a large field of view (FOV) device having a screen with a field of view of 90 degrees or more (e.g., 114 degrees or more). The display device 616 displays rendered graphic images 617 (e.g., finished frames 660) processed in accordance with various techniques described herein.

The system 600 may optionally include a mass storage device 615 such as a disk drive, CD-ROM drive, flash memory, tape drive, or the like to store programs and/or data. The system 600 may also optionally include a user interface unit 618 to facilitate interaction between the system 600 and a user. The user interface 618 may include a keyboard, mouse, joystick, light pen, game controller, and/or other device(s) that may be used in conjunction with a graphical user interface (GUI). The system 600 may also include a network interface 620 to enable the device to communicate with other remote devices 625 over a network 622. The network 622 may be, for example, a local area network (LAN), a wide area network such as the Internet, a personal area network, such as a Bluetooth network or other type of network. These components may be implemented in hardware, software, or firmware, or some combination of two or more of these.

Some virtual reality (VR) applications, e.g., multiplayer online video games or virtual worlds, include a VR Social screen feature that allows spectators at remote devices 625 to view the scene that the user of the system 600 sees.

The CPU 602 and GPU 604 may each include one or more processor cores, e.g., a single core, two cores, four cores, eight cores, or more. The memory 608 may be in the form of an integrated circuit that provides addressable memory, e.g., RAM, DRAM, and the like. The memory 608 may include a dedicated graphics memory 628 that may store graphics resources and temporarily store graphics buffers 605 of data for a graphics rendering pipeline. The graphics buffers 605 may include, e.g., vertex buffers VB for storing vertex parameter values, index buffers IB for holding vertex indices, depth buffers (e.g., Z-buffers) DB for storing depth values of graphics content, stencil buffers SB, frame buffers FB for storing completed frames to be sent to a display, and other buffers. In the example shown in FIG. 6, the graphics memory 628 is shown as part of the main memory. In alternative embodiments, the graphics memory 628 could be a separate hardware component, possibly integrated into the GPU 604. The memory 608 (possibly the graphics memory 628) may also temporarily store polygon data, foveation data, vertex density data, pixel resolution data, and tessellated vertex data, etc.

By way of example, and not by way of limitation, the CPU 602 and GPU 604 may access the memory 608 via the bus or busses 609. In some cases, it may be useful for the system 600 to include two or more different buses. The memory 608 may contain data that can be accessed by the CPU 602 and GPU 604. The GPU 604 may include a plurality of compute units configured to perform graphics processing tasks in parallel. Each compute unit may include its own dedicated local memory store, such as a local data share. Alternatively, the computer units may each access the memory 608 or a dedicated graphics memory 628.

The CPU may be configured to execute CPU code 603, which may include an application that utilizes graphics, a compiler and a graphics API. The CPU code 603 may also implement gaze tracking and image region adjustment. The graphics API can be configured to issue draw commands to programs implemented by the GPU 604. The CPU code 603 may also implement physics simulations and other functions. The GPU 604 may be configured to operate as discussed above. In addition, the GPU code 607 may also implement well-known shaders, such as compute shaders CS, vertex shaders VS, and pixel shaders PS. To facilitate passing of data between the compute shaders CS and the vertex shaders VS the system may include one or more buffers 605, which may include a frame buffer FB. The GPU code 607 may also optionally implement other types of shaders (not shown), such as pixel shaders or geometry shaders. Each compute unit may include its own dedicated local memory store, such as a local data share. The GPU 604 may include one or more texture units 606 configured to perform certain operations for applying textures to primitives as part of a graphics pipeline.

According to certain aspects of the present disclosure, the CPU code 603 and GPU code 607 and other elements of the system 600 are configured to implement a graphics pipeline in which the GPU 604 may receive polygon data. The polygon data can be generated from calculations, e.g., physics simulations of objects in a three-dimensional virtual space, implemented by execution of the CPU code 603 by the CPU 602. The GPU 604 performs a projection of the polygon vertices onto a screen space of the display device 616 and tessellation of the resulting projected polygons. The GPU 604 may adjust the density of the vertices for the tessellation of the polygons in accordance with the image data and vertex density data such that the density of vertices is higher in selected portions of the screen space and lower in remaining portions. Alternatively, the GPU 604 may adjust the pixel resolution for portions of images to be presented on the display in accordance with the image data and pixel resolution data such that the pixel resolution is higher in selected regions of interest in the screen space and lower in remaining portions. In some embodiments, the GPU 604 may adjust the both the vertex density and pixel resolution in accordance with the image data, the vertex density data and the pixel resolution data such that the vertex density and pixel resolution are higher in selected regions of interest in the screen space and lower in remaining portions.

The GPU 604 may then perform primitive assembly on the vertices to generate one or more primitives in screen space from the projection of the vertices onto the screen space. Scan conversion may then be performed on the one or more primitives to determine which pixels of screen space are part of corresponding primitives. The GPU 604 may then generate a finished frame by performing pixel processing to assign pixel values to the pixel or pixels that are part of the corresponding primitives. The finished frame can be stored in the memory 608 or graphics memory 628 (e.g., in the frame buffer FB) or displayed on the display device 616.

The projection of the polygon vertices onto the screen space and other related portions of the graphics pipeline can be performed in software, e.g., by a front end implemented as a compute shader CS. Alternatively, the projection of the vertices onto the screen space and other related portions of the graphics pipeline can be implemented by specially designed hardware components HW that are configured to implement these functions.

Aspects of the present disclosure also include embodiments in which the image data and/or vertex density data and/or pixel resolution data are adjusted dynamically. In such embodiments, the system 600 includes hardware for tracking a user's gaze, i.e., where a user's eye is pointing, and relating this information to a corresponding screen location that the user is looking at, e.g., as discussed above and further explained below. One example of such hardware could include a digital camera in a known location with respect to the screen of the display device 616 and pointed in the general direction of a user. The digital camera could be part of the user interface 618 or a separate component. The CPU code 603 could include image analysis software that analyzes images from the camera to determine (a) if the user is in the image; (b) if the user is facing the camera; (c) if the user is facing the screen; (d) if the user's eyes are visible; (e) the orientation of the pupils of the user's eyes relative to the user's head; and (f) the orientation of the user's head relative to the camera. From the known position and orientation of the camera with respect to the screen, the orientation of the pupils of the user's eyes relative to the user's head and the orientation of the user's head relative to the camera the image analysis software could determine whether the user is looking at the screen and, if so, screen space coordinates for the portion of the screen the user is looking at. The CPU code 603 could then pass these screen coordinates to the GPU code 607, which could determine the subsection or subsections corresponding to one or more regions of interest. The GPU code 607 could then modify the adjustment of vertices and or pixel resolution accordingly.

By way of example, and not by way of limitation, specially designed hardware, the texture unit(s) 606, certain types of shaders, and other parts of the graphics pipeline described below may be implemented by special purpose hardware, such as an application-specific integrated circuit (ASIC), Field Programmable Gate Array (FPGA), or a system on chip (SoC or SOC).

As used herein and as is generally understood by those skilled in the art, an application-specific integrated circuit (ASIC) is an integrated circuit customized for a particular use, rather than intended for general-purpose use.

As used herein and as is generally understood by those skilled in the art, a Field Programmable Gate Array (FPGA) is an integrated circuit designed to be configured by a customer or a designer after manufacturing—hence "field-programmable". The FPGA configuration is generally specified using a hardware description language (HDL), similar to that used for an ASIC.

As used herein and as is generally understood by those skilled in the art, a system on a chip or system on chip (SoC or SOC) is an integrated circuit (IC) that integrates all components of a computer or other electronic system into a single chip. It may contain digital, analog, mixed-signal, and often radio-frequency functions—all on a single chip substrate. A typical application is in the area of embedded systems.

A typical SoC may include the following hardware components: one or more processor cores (e.g., microcontroller, microprocessor or digital signal processor (DSP) cores); memory blocks, e.g., read only memory (ROM), random access memory (RAM), electrically erasable programmable read-only memory (EEPROM) and flash memory; timing sources, such as oscillators or phase-locked loops; peripherals, such as counter-timers, real-time timers, or power-on reset generators; external interfaces, e.g., industry standards such as universal serial bus (USB), FireWire, Ethernet, universal asynchronous receiver/transmitter (USART), serial peripheral interface (SPI) bus; analog interfaces including analog to digital converters (ADCs) and digital to analog converters (DACs); and voltage regulators and power management circuits.

These components are connected by either a proprietary or industry-standard bus. Direct Memory Access (DMA) controllers route data directly between external interfaces and memory, bypassing the processor core and thereby increasing the data throughput of the SoC.

A typical SoC includes both the hardware components described above, and executable instructions (e.g., software or firmware) that controls the processor core(s), peripherals and interfaces.

In some embodiments, some or all of the functions of parts of the graphics pipeline may alternatively be implemented by appropriately configured software instructions executed by a software programmable general purpose computer processor, e.g., as compute shaders CS executed by the GPU 604. Such instructions may be embodied in a computer-readable medium, e.g., memory 608, graphics memory 628, or storage device 615.

Although examples are described herein with respect to head mounted display (HMD) applications, aspects of the present disclosure are not limited to such embodiments. HMD embodiments represent a relatively straightforward embodiment because the relative locations of the user's eyes and the display screen remain more or less fixed. In principle, however, the disclosed system and method may be adapted to any image display system that can work with gaze tracking. The gaze tracking system may be modified to track the location and orientation of the user's head and eye(s) relative to the display screen in embodiments where these are not fixed.

Although the description has been described with respect to particular embodiments thereof, these particular embodiments are merely illustrative, and not restrictive. Concepts illustrated in the examples may be applied to other examples and embodiments.

In various embodiments, software is encoded in one or more non-transitory computer-readable media for execution by one or more processors. The software when executed by one or more processors is operable to perform the embodiments described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the embodiments described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A computer-implemented method comprising:
presenting one or more images to a user;
obtaining gaze tracking data relating to a gaze of the user with respect to the one or more images presented to the user;
detecting one or more first gaze characteristics from the gaze tracking data, wherein the one or more first gaze characteristics indicate a first state of the gaze of the user, and wherein the first state of the gaze of the user is a squinting state;
measuring a corneal reflection in at least one eye of the user;
generating a squint value based on a corneal reflection value from the measuring of the corneal reflection, wherein the squint value is inversely proportional to the corneal reflection value and is based on a reduction of the corneal reflection value, and wherein the squint value represents an amount of squinting associated with the squinting state; and
reducing a brightness of at least one portion of the one or more images presented to the user based on the squint value, wherein an amount of reduction of the brightness is proportional to the squint value, and wherein the at least one portion of the one or more images is a subsection of the one or more images.

2. The method of claim 1, wherein the one or more images is presented to the user by a display device of a head-mounted display.

3. The method of claim 1, wherein the obtaining of the gaze tracking data is performed in a head-mounted display.

4. The method of claim 1, wherein the obtaining of the gaze tracking data is performed by an eye tracking device of a head-mounted display.

5. The method of claim 1, wherein the obtaining of the gaze tracking data is performed using an integrated camera of a head-mounted display.

6. The method of claim 1, wherein the gaze tracking data comprise an amount of reflections of light off of a cornea of at least one eye of the user.

7. The method of claim 1, wherein the one or more first gaze characteristics indicate the amount of squinting.

8. The method of claim 1, wherein the detecting of the one or more first gaze characteristics comprises determining some missing glints off at least one eye of the user.

9. The method of claim 1, further comprising generating the squint value, wherein the squint value is based on a reduction of a corneal reflection value associated with at least one eye of the user.

10. The method of claim 1, wherein the one or more first gaze characteristics comprise a change in a corneal reflection value associated with at least one eye of the user.

11. The method of claim 1, wherein the one or more first gaze characteristics comprise a reduction in a corneal reflection value associated with at least one eye of the user.

12. The method of claim 1, further comprising reducing the brightness of the one or more images for a predetermined duration of time.

13. The method of claim 1, further comprising increasing the brightness of the one or more images at a predetermined rate based on one or more second gaze characteristics.

14. The method of claim 1, further comprising restoring the brightness of the one or more images based on one or more second gaze characteristics.

15. The method of claim 1, further comprising restoring the brightness of the one or more images based on a change of the first state of the gaze of the user.

16. The method of claim 1, further comprising restoring the brightness of the one or more images when the gaze of the user changes from the first state of the gaze of the user to a second state of the gaze of the user, wherein the second state of the gaze of the user is a non-squinting state.

17. A non-transitory computer-readable storage medium with program instructions stored thereon, the program instructions when executed by one or more processors are operable to perform operations comprising:
   presenting one or more images to a user;
   obtaining gaze tracking data relating to a gaze of the user with respect to the one or more images presented to the user;
   detecting one or more first gaze characteristics from the gaze tracking data, wherein the one or more first gaze characteristics indicate a first state of the gaze of the user, and wherein the first state of the gaze of the user is a squinting state;
   measuring a corneal reflection in at least one eye of the user;
   generating a squint value based on a corneal reflection value from the measuring of the corneal reflection, wherein the squint value is inversely proportional to the corneal reflection value and is based on a reduction of the corneal reflection value, and wherein the squint value represents an amount of squinting associated with the squinting state; and
   reducing a brightness of at least one portion of the one or more images presented to the user based on the squint value, wherein an amount of reduction of the brightness is proportional to the squint value, and wherein the at least one portion of the one or more images is a subsection of the one or more images.

18. A system comprising:
one or more processors; and
logic encoded in one or more non-transitory computer-readable storage media for execution by the one or more processors and when executed operable to perform operations comprising:
   presenting one or more images to a user;
   obtaining gaze tracking data relating to a gaze of the user with respect to the one or more images presented to the user;
   detecting one or more first gaze characteristics from the gaze tracking data, wherein the one or more first gaze characteristics indicate a first state of the gaze of the user, and wherein the first state of the gaze of the user is a squinting state;
   measuring a corneal reflection in at least one eye of the user;
   generating a squint value based on a corneal reflection value from the measuring of the corneal reflection, wherein the squint value is inversely proportional to the corneal reflection value and is based on a reduction of the corneal reflection value, and wherein the squint value represents an amount of squinting associated with the squinting state; and reducing a brightness of at least one portion of the one or more images presented to the user based on the squint value, wherein an amount of reduction of the brightness is proportional to the squint value, and wherein the at least one portion of the one or more images is a subsection of the one or more images.

* * * * *